(12) United States Patent
Wolff et al.

(10) Patent No.: US 12,108,694 B2
(45) Date of Patent: Oct. 8, 2024

(54) METHOD FOR PERFORMING AN AGRICULTURAL TASK

(71) Applicant: DEERE & COMPANY, Moline, IL (US)

(72) Inventors: Kilian Wolff, Mandelbachtal (DE); Stefan Kuebler, Teutschenthal (DE); Florian Reinmuth, Sinsheim (DE); Georg Kormann, Zweibruecken (DE); Akshay Kumar, Kaiserlautern (DE)

(73) Assignee: Deere &Company, Moline, IL (US)

( * ) Notice: Subject to any disclaimer, the term of this patent is extended or adjusted under 35 U.S.C. 154(b) by 416 days.

(21) Appl. No.: 17/305,428

(22) Filed: Jul. 7, 2021

(65) Prior Publication Data

US 2022/0007564 A1 Jan. 13, 2022

(30) Foreign Application Priority Data

Jul. 7, 2020 (DE) .......................... 102020117911.1

(51) Int. Cl.
*A01B 69/04* (2006.01)
*A01C 14/00* (2006.01)
(Continued)

(52) U.S. Cl.
CPC ............ *A01B 69/008* (2013.01); *A01C 14/00* (2013.01); *G05D 1/0219* (2013.01); *A01C 21/005* (2013.01)

(58) Field of Classification Search
CPC ..... A01B 69/008; A01B 79/005; A01C 14/00; A01C 21/005; A01C 7/04; G05D 1/0219; G05D 2201/0201
See application file for complete search history.

(56) References Cited

U.S. PATENT DOCUMENTS

2002/0165649 A1\* 11/2002 Wilhelm Rekow . G05D 1/0295
701/466
2008/0105177 A1\* 5/2008 Dix ........................ A01C 7/087
111/200
(Continued)

FOREIGN PATENT DOCUMENTS

DE 69805859 T2 12/2002
DE 4322293 C2 5/2003
(Continued)

OTHER PUBLICATIONS

Oliver Schmitmann et al., Develop a precision seed drive for coordinated seed storage, Plants and Techniques, dated 2010, pp. 286-287.
(Continued)

*Primary Examiner* — Abdalla A Khaled
(74) *Attorney, Agent, or Firm* — Hanley, Flight & Zimmerman, LLC

(57) ABSTRACT

A method performing an agricultural task on a field, the method comprising: identifying a number of plants in the field on a per unit area; determining a field pattern of plant maintenance for the plants in the field, the field pattern comprising: a planting instruction for travel in a first direction; and a plant maintenance instruction for travel in a second direction which is not parallel to the first direction, the plant maintenance instruction generated using at least one parameter corresponding to the number of plants in the field on a per unit area.

20 Claims, 3 Drawing Sheets

(51) Int. Cl.
*G05D 1/00* (2024.01)
*A01C 21/00* (2006.01)

(56) References Cited

U.S. PATENT DOCUMENTS

| | | | | |
|---|---|---|---|---|
| 2013/0184944 | A1* | 7/2013 | Missotten | A01D 41/127 |
| | | | | 701/50 |
| 2014/0379228 | A1* | 12/2014 | Batcheller | A01C 7/201 |
| | | | | 701/50 |
| 2015/0025752 | A1* | 1/2015 | Tolstedt | G05D 1/0278 |
| | | | | 701/50 |
| 2017/0168501 | A1* | 6/2017 | Ogura | G05D 1/0016 |
| 2017/0177002 | A1* | 6/2017 | Ogura | G05D 1/0295 |
| 2019/0205610 | A1* | 7/2019 | Muehlfeld | G06T 5/50 |
| 2019/0246549 | A1* | 8/2019 | Peters | G05D 1/0274 |
| 2021/0089051 | A1* | 3/2021 | Markov | G05D 1/0291 |
| 2022/0287290 | A1* | 9/2022 | Glasbrenner | A01M 7/0089 |

FOREIGN PATENT DOCUMENTS

| | | |
|---|---|---|
| DE | 10251114 A1 | 5/2004 |
| DE | 102005010686 A1 | 10/2005 |
| DE | 102007040511 A1 | 3/2009 |
| DE | 102015217496 A1 | 3/2017 |
| DE | 102016207510 A1 | 11/2017 |
| DE | 102016212201 A1 | 1/2018 |
| DE | 102016214554 A1 | 2/2018 |
| DE | 102019103233 A1 | 8/2019 |
| EP | 2517545 A1 | 10/2012 |
| EP | 3406125 A2 | 11/2018 |
| EP | 2636292 B1 | 10/2019 |
| EP | 3566558 A1 | 11/2019 |
| EP | 3569045 A1 | 11/2019 |
| EP | 3571913 A1 | 11/2019 |

OTHER PUBLICATIONS

International Organization for Standardization, "Agricultural wheeled tractors—Rear-mounted three-point linkage—Part 1: Categories 1, 2, 3 and 4," ISO 730-1 : 1990 (E), Mar. 8, 1990, 6 pages.

* cited by examiner

METHOD FOR PERFORMING AN AGRICULTURAL TASK

RELATED APPLICATIONS

This document claims priority based on German Patent Application No. 102020117911.1, filed on Jul. 7, 2020, which is hereby incorporated by reference into this application.

DESCRIPTION

The disclosure relates to a method for performing an agricultural task, and more specifically a method for cultivating plants in a field pattern with locally adapted variation of the plant density.

BACKGROUND

Satellite-assisted position determining systems are used, amongst other things, when working on agricultural areas in order to perform an agricultural task, such as introducing individual seed particles or plants at specific locations in the soil during sowing or planting operations. In this manner, it is also possible to achieve specific patterns which also permit travel tracks for the treatment of a field, in particular hoeing weeds, fertilizing, dispensing plant protection agents. Generally, the planning of the patterns is carried out in advance on a computer, wherein the coordinates at which the seed particles or plants are introduced into the soil are fixed in order to achieve the desired pattern or a first row is dispensed on the field and the following rows are oriented laterally to the first row relative to the forward direction of the seed drill or planter. When sowing or planting individual seed particles or plants in a pattern, it is generally also provided not to dispense any plants at those locations where a vehicle is subsequently intended to travel in the transverse direction in order to carry out plant maintenance operations, such as for example to remove weeds between the plants.

SUMMARY

A method performing an agricultural task on a field, the method comprising: identifying a number of plants in the field on a per unit area; determining a field pattern of plant maintenance for the plants in the field, the field pattern comprising: a planting instruction for travel in a first direction; and a plant maintenance instruction for travel in a second direction which is not parallel to the first direction, the plant maintenance instruction generated using at least one parameter corresponding to the number of plants in the field on a per unit area.

An agricultural machine system for performing an agricultural task in a field, the agricultural machine system comprising: an agricultural machine; a frame connected to the agricultural machine, the frame configured with at least two units to perform an agricultural task; and a controller in communication with the agricultural machine and the at least two units, the controller configured to determine a field pattern for performing the agricultural task, the field pattern comprising: an agricultural task instruction for travel in a first direction; and an agricultural task instruction for travel in a second direction which is not parallel to the first direction, the agricultural task instructions for travel in a second direction generated using at least one parameter corresponding to crop density.

DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

DETAILED DESCRIPTION

Figure 1:
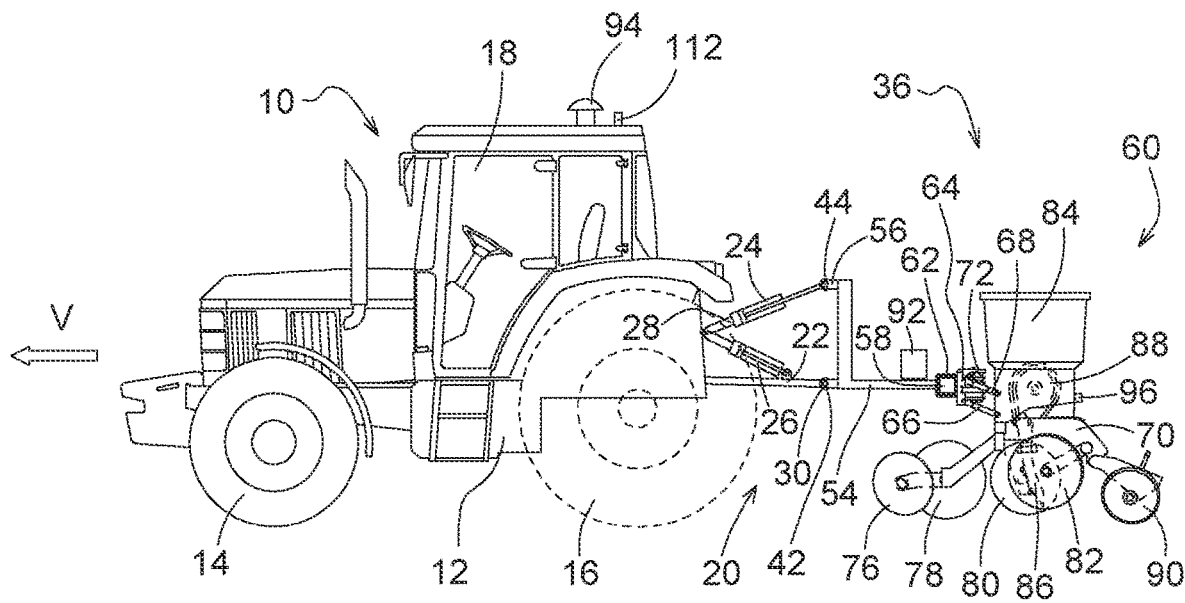
FIG. 1 shows a schematic lateral view of a machine for dispensing seed which is attached to a field tractor.

In some cases, it is possible to perform an agricultural task, such as certain seed placement at a specific location, to achieve a specific pattern during sowing or planting operations. These cases include German Patent Application No. DE 102 51 114 A1 which discloses travel tracks for the treatment of a field, in particular hoeing weeds, fertilizing, dispensing plant protection agents, German Patent Application No. DE 10 2005 101 686 A1 which discloses travel in the transverse or diagonal direction to the original planting direction, German Patent Application No. DE 10 2007 040 511 A1 which discloses optimizing solar radiation and German Patent Application No. DE 10 2015 217 496 A1 which discloses optionally taking into account the three-dimensional topography of the terrain.

Further, these cases typically utilize a computer for planning of the patterns in advance, wherein the coordinates at which the seed particles or plants are introduced into the soil are fixed in order to achieve the desired pattern or a first row is dispensed on the field and the following rows are oriented laterally to the first row relative to the forward direction of the seed drill or planter (see O. Schmittmann, et al., "Development of a Precision Seed Drill Drive for Coordinate-Controlled Depositing of Seeds", Landtechnik 2010, 286).

When performing an agricultural task, such as sowing or planting individual seed particles or plants in a pattern, it is generally also provided not to dispense any plants at those locations where a vehicle is subsequently intended to travel in the transverse direction in order to carry out a different agricultural task, such as plant maintenance operations to remove weeds between the plants. Thus, the dispensing process is intentionally omitted at the locations where the tramlines, running transversely or at an angle (different from 0 and 90°) to the direction of travel used when introducing the plants or the seed into the soil, are intended to be located. Similarly, during sowing or planting, sowing units are not activated at the locations where the tramlines, running in the direction of travel used when introducing the plants or the seed into the soil, are intended to be located, which permits a treatment of the plant crop in two different non-parallel directions. To this end, reference is made to European Patent Appl. Nos. EP 3 566 558 A1 and EP 3 569 045 A1, and US Patent Publication No. 2015/0025752. A creation of tramlines in the transverse direction to the sowing direction in seed drills has also been disclosed (German Patent Application No. DE 10 2016 207 510 A1 and the references cited therein). With sufficiently large spacings between the plants and/or narrow tires, it is possible to dispense with the gaps for the tramlines since in this case it is possible to travel between adjacent rows without damaging the plants.

In other cases of plant cultivation, it has also already been proposed to select the quantity of seed per unit area according to local conditions, i.e., to cultivate the seed at densities deviating from an average value at locations where the plants due to local conditions deviating from an average value (for example to dispense the plants at lower crop densities at locations where the plants grow more weakly due to poorer soils and/or water supply). To this end, it is possible to use stored maps in which the soil properties are stored and/or suitable sensors on the seed drill in order to adapt the quantity of seed, depending on the distance covered, to the soil properties (see German Patent Application Nos. DE 43 22 293 C2 and DE 10 2016 214 554 A1) or to change between the different types of seed dispensed (German Patent Application No. DE 10 2019 103 233 A1).

The previously mentioned cases disclose, on the one hand, cultivating the plants in patterns in order to be able to carry out plant maintenance measures in two different directions which are not parallel to one another, and also disclose, on the other hand, an approach which was not previously compatible with cultivating plants in patterns, to vary the number of plants per unit area in a site-specific manner. The lack of compatibility has the result that changing the spacing of the seed or the plants during sowing or planting in a first direction of travel, disclosed for example in German Patent Application No. DE 10 2016 214 554 A1, also means changing the spacings of the plants transversely to a second direction of travel, which is used later when implementing the plant maintenance measures. The plant maintenance device, however, generally has fixed dimensions which, in some cases, may not be adapted to the variable spacings of the plants in the transverse direction.

As disclosed herein, it is possible both to adapt the number of plants per unit area to local conditions and also to implement plant maintenance measures in two non-parallel directions during the cultivation of plants in patterns. In other words, while a regular field pattern of plants which may be traveled over in two different directions is generated, at least one parameter of the pattern is varied according to a selectable number of plants cultivated per unit area. As a result, an adaptation of the planting density to local conditions may be made but a treatment process is still possible in two different directions.

In another example, additionally there may be the step of implementing plant maintenance measures on the plants by means of the plant maintenance machine or a different plant maintenance machine in the first direction.

The parameter of the pattern adapted to the number of plants to be cultivated per unit area may be one or more of the following variables: the spacing of the plants in the first direction, the spacing of the plants in the second direction, the angle between the first direction and the second direction and/or the number of voids in the pattern. The number of plants to be cultivated per unit area may depend on the respective location on the field and may vary across the field, depending on local conditions. It might also be possible, however, in a field with sufficiently uniform conditions, to use a consistent planting density for the entire field. The parameter may continuously change in the first and/or second direction if it appears expedient due to the local conditions of the field. In other words, in such cases, abrupt changes to the parameter are not provided, but merely gradual changes. Thus if the parameter were to change abruptly by 50% over a relatively short length of, for example, 0.5 m, for example due to a change in the type of soil, this very abrupt change to the parameter is distributed over a greater length of, for example, 5 m in order to take into account (in particular when varying a parameter which is different from the number of voids) the reaction time and adjusting speed of an actuator (of the seed drill or planter and the plant maintenance machine, in particular of the slowest actuator thereof) which has to be adapted to the changing parameter. Additionally, in this manner the change to the working width and/or track width of the plant maintenance machine resulting from specific changes to the parameter may also be taken into account.

The spacing of implements of the plant maintenance machine is able to be changed using an actuator in order to be able to implement plant maintenance measures even when, due to a changing parameter, the row spacings vary in the transverse direction to the first and/or second direction, which also applies to the track width of the plant maintenance machine, or tramlines running in the second direction are provided with a uniform track width in the pattern.

The determination of the pattern and/or the position of the tramlines provided for the plant maintenance machine and/or the track width of the tramlines of the plant maintenance machine may be carried out in advance and/or during the dispensing of the plants, wherein the planning which takes place during the dispensing is based, in particular, on local sensors of the planter or seed drill. A planning which has been carried out in advance, therefore, based on the signals of the local sensors may be complemented, adapted or replaced thereby.

Unintentional voids arising during the dispensing of the plants, due to a malfunction of the planter or seed drill during the dispensing of the plants and/or seed, may be taken into account such that an originally provided void is occupied if an unintentional void arises in the vicinity thereof.

An agricultural machine, such as field tractor 10, which is constructed on a chassis 12 and is supported on the soil by front, steerable (and optionally drivable) wheels 14 and rear drivable (and optionally steerable) wheels 16 is shown in FIG. 1. An operator station is located in a cab 18. A three-point hitch 20 which is composed of two adjacently arranged lower link arms 22 and an upper link arm 28 attached thereabove is arranged at the rear end of the chassis 12. The lower link arms 22 are height-adjustable by means of associated dual-acting hydraulic cylinders 26 which pivot the lower link arms 22 about their points of articulation on the chassis 12, about horizontal axes oriented approximately transversely to the forward direction. The upper link arm 28 is designed as a hydraulic cylinder 24 and accordingly so as to be variable in length. By adjusting the hydraulic cylinders 26, rear coupling points 30 of the lower link arms 22 may be moved into a position which is suitable for attaching a seed drill 36. By adjusting the length of the upper link arm 28, which instead of being carried out by the hydraulic cylinder 24 could be carried out purely mechanically by the operator, manually by means of a suitable threaded spindle, a rear coupling point 44 of the upper link arm 28 may be moved into a suitable position for attaching the seed drill 36. Lower link arm coupling points 30 in the form of upwardly extending catching hooks are arranged at the rear end of the lower link arms 22 in a manner known per se (or any other coupling points, for example coupling eyes as are described in DIN ISO 730-1 Agricultural wheeled tractors—rear-mounted three-point linkage—Part 1: Categories 1, 2, 3 and 4) whilst a similarly conventional upper link arm coupling point 44 is provided at the rear end of the upper link arm 28.

The hydraulic cylinder 24 of the upper link arm 28 serves merely for a single, initial setting of the position of the coupling point 44 and during field work is not adjusted but is blocked per se (as are the hydraulic cylinders 26 of the lower link arm 22). At the field end, the seed drill 36 may be lifted away by the hydraulic cylinders 26 being retracted via a suitable valve (not shown) by the operator or the automatic headland system and thus moved into the lifted position and similarly lowered again before treating the next track. As a result, the lower link arms 22 are lifted and lowered again by the hydraulic cylinders 26, whereby the seed drill 36 is also lifted and lowered.

The seed drill 36 comprises a holding frame 54 which is fastened by lower bolts 42 to the lower link arm coupling points 30 of the lower link arms 22 and by an upper holding element 56 and a bolt to the upper link arm coupling point 44. A cross member 58 is fastened to the holding frame 54, said cross member extending over the entire width of the seed drill 36 and, in the embodiment shown, four sowing units 60 being fastened thereto laterally adjacent to one another, wherein any other numbers of sowing units 60 are possible, however. The fastening of the sowing units 60 to the cross member 58 is carried out via U-shaped holders 62 which are connected to a bracket 64 which extends vertically on the rear face of the cross member 58 and on which two link arms 66, 68 are articulated one above the other, said link arms in each case also being articulated to a frame 70 of the sowing unit 60. The link arms 66, 68 form with the bracket 64 and the frame 70 an adjustable parallelogram which defines the height of the frame 70 above the soil. A pneumatic actuator 72 acts, on the one hand, at the top on the bracket 64 and, on the other hand, at the bottom on the lower link arm 66 and defines the position of the frame 70 and the contact force by which furrow openers 78, 80 supported on the frame 70 cooperate with the earth.

The frame 70, in a manner known per se, bears a seed container 84, a sowing coulter 86 and a metering device 88 (in particular operating pneumatically at negative pressure provided by a fan, not shown) which gradually dispenses individual grains of the seed from the seed container 84 into the sowing coulter 86, which deposits the seed in a furrow which is produced by the furrow opener 80, the working depth thereof being predetermined by a gauge wheel 82. The furrow is closed by a closing wheel 90. A further furrow may be produced by a furrow opener 78, the working depth thereof being predetermined by a gauge wheel 76. This further furrow may serve for receiving fertilizer by means of a further coulter, not shown, and may also be closed by the closing wheel 90. Regarding further details of the sowing units 60 reference is made to the disclosure of European Patent Appl. No. EP 2 517 545 A1, the disclosure thereof being incorporated by way of reference in the present documentation. The seed drill 36 could also be supported on wheels and pulled behind the field tractor 10 on a drawbar, instead of the fastening to the three-point hitch 20 shown. The seed drill 36 represents an example of a machine for dispensing seed particles and in a further embodiment could also dispense young plants or seedlings.

Figure 2:
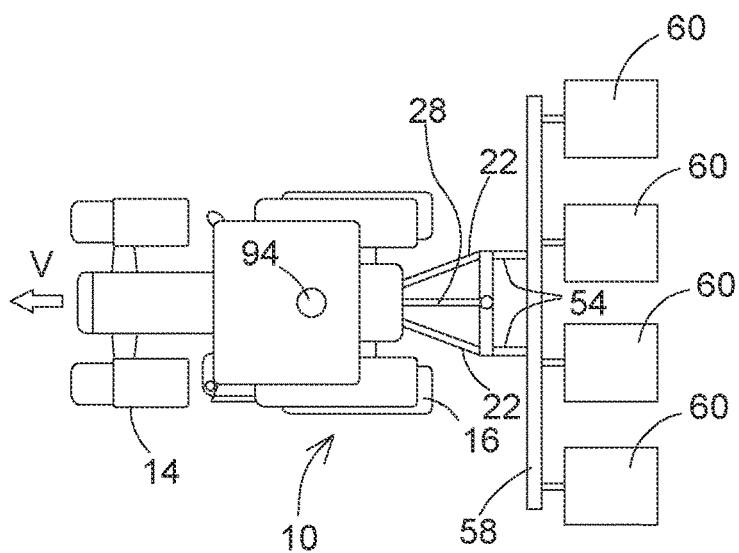
FIG. 2 shows a plan view of the machine of FIG. 1.

An antenna of a position determining system 94 is attached to the roof of the cab 18 and receives signals from satellites, for example GPS, Galileo and/or Glonass systems in order to determine its position. The position data are supplied by the position determining system 94 to a controller 92 which in turn is connected to actuators 96 of the sowing units 60 which may be activated by the controller 92, in each case to discharge a seed particle into the soil. The position determining system 94 could alternatively be attached to the seed drill 36, as could also the controller 92 and an optional inertia or gravity sensor 112 for detecting the inclination of the field in the forward direction V and/or transverse direction. The inertia or gravity sensor 112 may serve in the case of non-horizontal fields to vary the spacing between the plants in the forward direction V of the seed drill 36 in order to achieve that this spacing measured in the horizontal direction corresponds to a target value as set forth in detail in German Patent Appl. No. DE 10 2015 217 496 A1. If the position determining system 94, the controller 92 and optionally the inertia or gravity sensor 112 are located on the field tractor 10, as shown in FIGS. 1 and 2, the combination shown of the seed drill 36 and the field tractor 10 may be regarded as a planter or seed drill for dispensing the seed particles or plants within the meaning of the claims.

Figure 3:
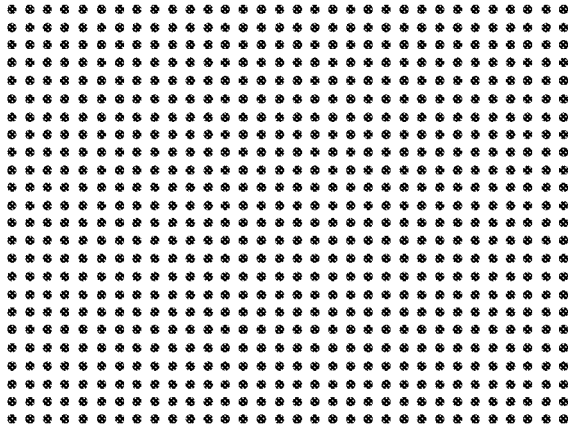
FIG. 3 shows a plan view of a field with seed dispensed by the machine.

As known per se in some cases (e.g., German Patent Appl. No. DE 10 2015 217 496 A1) the controller 92 is configured to activate the actuators 96 as a function of the signals of the position determining system 94 such that the dispensed seed particles or plants are dispensed in a regular field pattern. Such a regular (namely a square) pattern is shown in FIG. 3. The spacing of the seed particles or plants in the first direction (forward direction) of the seed drill 36 which may run in FIG. 3 horizontally or vertically, therefore, is equal in the first and second (transversely running) direction. The activation of the actuators 96 for the purpose of dispensing the pattern may take place using a map stored in advance or only fixed during the sowing process. Reference might also be made to the disclosure of German Patent Appl. No. DE 10 2015 217 496 A1, the disclosure thereof being incorporated by way of reference in the present documentation.

Figure 4:
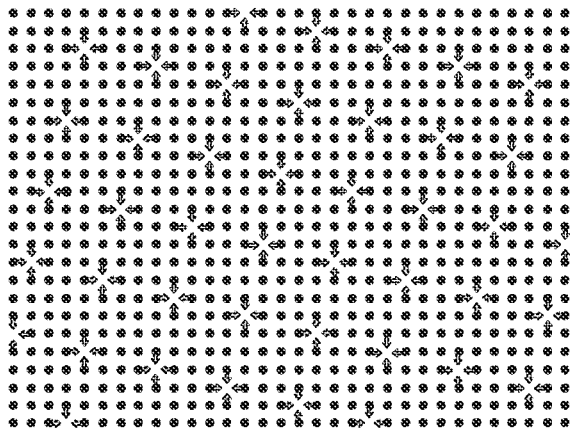
FIG. 4 shows the plan view according to FIG. 3 with a reduced number of plants per unit area.
Figure 5:
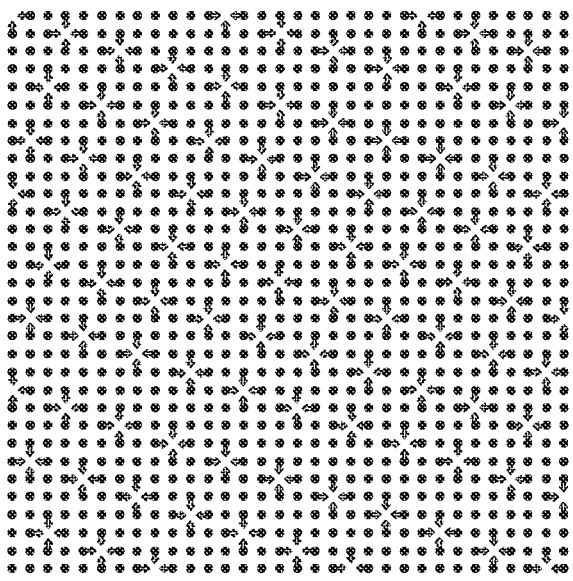
FIG. 5 shows the plan view according to FIG. 4 with a further reduced number of plants per unit area.

In order to adapt the crop density (number of plants per unit area) to different growth conditions, such as soil type, soil moisture, solar radiation, etc. the controller 92 is configured to activate the actuators 96 according to FIGS. 3 to 5. Starting from a maximum possible crop density of 100% (predetermined by the spacings between the plants), as shown in FIG. 3, by inserting voids, i.e., positions in the pattern of FIG. 3 where plants are not introduced (are absent), the crop density may be reduced, in FIG. 4 to 94% and in FIG. 5 to 90%. Naturally, intermediate values are also possible and even lower crop densities, in an extreme case 0%. The spacing of the plants cultivated in the pattern, however, remains equal apart from the inserted voids.

The voids, as identifiable in FIGS. 4 and 5, are also arranged in a pattern (in this case: a square) which has a greater spacing between the voids than between the plants of the basic pattern of FIG. 3 which is free of voids, and in the example shown enclose an angle with the first and second direction of the basic pattern, which is optional, however. The pattern of the voids could, therefore, be oriented with the basic pattern. The pattern of the voids becomes all the more close-meshed, the lower the crop density becomes.

The voids are inserted—since adjacent voids are spaced apart from one another, at least as long as the desired crop density permits it, so that at least one plant remains between the voids—such that the remaining plants profit as evenly as possible from the freed space (by additional nutrients/sunlight, etc.), at least as long as this is permitted by the external conditions such as water supply and light.

The crop density and thus the number of voids of the first embodiment may be dictated, as already indicated, in a manner known per se, by plant production properties of the field, such as soil type, soil moisture, solar radiation etc. (i.e., slope inclination, potential shade, etc.) The crop density may be selected equally for an entire field or may be varied across the field. For fixing the crop density it is possible to use local sensors on the field tractor 10 or on the seed drill 36 and/or it may be based on data determined in advance by sensors, for example by a harvesting machine which has harvested the relevant field in the previous year, and/or soil samples and/or by short-range or long-range detection by means of drones or satellites. To this end reference might be made to German Patent Appl. No. DE 10 2016 214 554 A1, the disclosure thereof being incorporated by way of reference in the present documentation.

Accordingly, the pattern and/or the number of voids may be planned or only produced during the sowing process, based amongst other things on sensors of the seed drill 36 and/or the field tractor 10.

In this case it may be considered that in each seed drill unintentional voids may arise due to errors in the singling process. Since these voids may be detected by corresponding sensors (see European Patent Appl. No. EP 2 636 292 B1 and references cited therein), a pattern planned or during the dispensing process may also be correspondingly adapted in order to achieve the actually desired sowing rate and/or distribution of plants on the field at the desired crop density. Thus, a planned void in the vicinity of an unintentional void arising during the sowing process, in contrast to that provided in the original pattern, may be occupied with a plant in order to achieve the desired crop density.

The method indicated in FIGS. 3 to 5 makes it possible, due to the equal spacings between the plants in the first direction (illustrated horizontally or vertically) in which the seed drill 36 is moved over the field, and the second direction (illustrated vertically or horizontally), to travel over the field with a multi-row plant maintenance machine 100 (see FIG. 6) in order to remove weeds growing between the plants, for example by means of a hoe or to fertilize the plants or to spray with plant protection agents. To this end, reference may be made, for example, to the disclosure of German Patent Appl. No. DE 10 2016 212 201 A1. However, it might also be conceivable to provide the basic rectangular pattern with spacings which in the first direction are different from the spacings in the second direction and to use different plant maintenance machines for both directions or reconfigure these plant maintenance machines in order to adapt them to the respective direction, as disclosed for example in European Patent Appl. No. EP 3 569 045 A1. Moreover, the angle between the first direction and the second direction does not necessarily have to be 90° but may deviate therefrom, as disclosed in German Patent Appl. No. 10 2015 217 496 A1. Also, in this case, different plant maintenance machines could be used for both directions or reconfigured in order to adapt them to the respective direction.

The pattern of the voids would be correspondingly adapted to the described non-square patterns of the plants, i.e., with a rectangular pattern it would be rectangular and with a non-rectangular pattern it would be rhomboid-shaped. Naturally, any other patterns of the voids are also possible, for example a circular or triangular pattern.

In the light of all of the above, in the first embodiment of FIGS. 3 to 5, by means of the correspondingly configured controller 92 or planning software running on any type of computer for creating an electronic prescription map which is provided to the controller 92, the basic pattern is maintained, i.e. the parameters of the spacings of the plants in both directions and the angle between both directions remains equal, although voids are incorporated in the pattern in order to vary the crop density.

Figure 6:
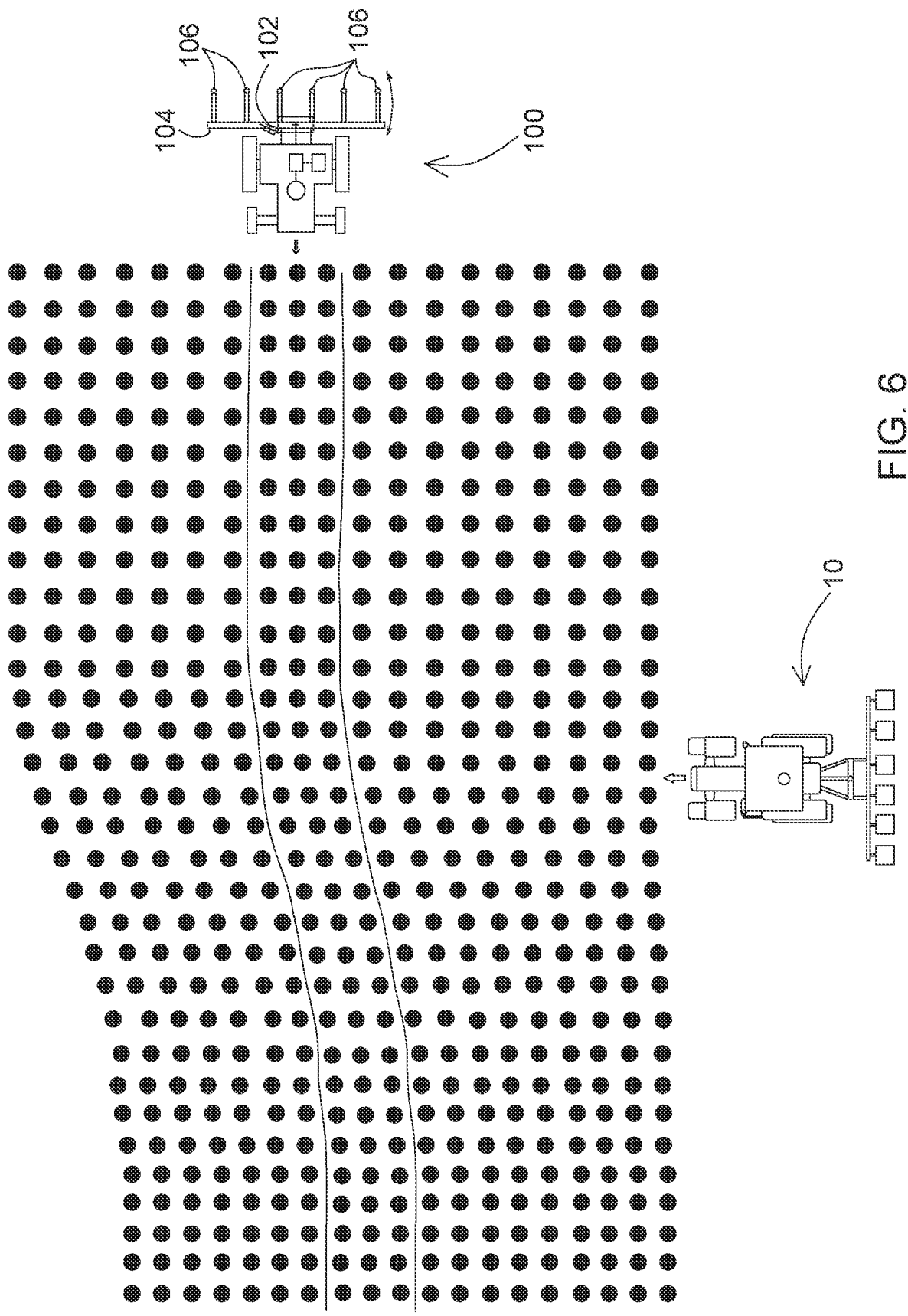
FIG. 6 shows a plan view of a field with seed dispensed by the machine, which is carried out according to a second embodiment.

In the second embodiment which is shown in FIG. 6, however, in order to vary the crop density voids are not inserted in a pattern but the spacings between the plants in the first direction, i.e., the direction of travel V of the seed drill 36, are varied by means of the correspondingly configured controller 92 or planning software running on any type of computer for creating an electronic prescription map which is provided to the controller 92. It is identified in FIG. 6 that on the right-hand part of the field greater spacings are provided between the plants than in the left-hand part of the field. Therefore, the seed drill 36 is activated by the controller 92 such that in the first direction which corresponds to the direction of travel of the seed drill 36 running upwardly or downwardly in FIG. 6 (illustrated at the bottom) the seed particles or plants in the left-hand part of the field are dispensed at smaller spacings than in the right-hand part of the field.

By the changing spacings in the first direction, for a plant maintenance machine 100 when it travels in the second horizontal direction in FIG. 6, whether manually steered by an operator or automatically steered based on a stored map, an adjustment of the working width is expedient for maintenance of the plants (for example for removing weeds between the rows), as may be identified in FIG. 6. To this end, in a simple embodiment a cross member 104, to which the units 106 for plant maintenance are attached, may be rotated by an actuator 102 about the vertical axis, for which reference may be made to the disclosure of European Patent Appl. No. EP 3 571 913 A1, the disclosure thereof being incorporated by way of reference in the present documentation, in order to achieve that the units 106 are guided in each case as centrally as possible between two rows of plants spaced apart transversely to the second direction.

In a further embodiment which may also be combined with the embodiment described above with the cross member, which is rotatable by actuator about the vertical axis, the units 106 for the plant maintenance may be laterally displaced relative to the cross member 104, separately from one another by assigned actuators 102 (or together by a single actuator 102 via a suitable mechanism).

The lateral adjustment range of the units 106 of the plant maintenance machine 100 limits the actual achievable spacings between the plants and thus the plant density to be achieved (upwardly and downwardly). If the desired density falls below the achievable density (which is able to be treated by the plant maintenance machine, since otherwise it leads to spacings of the plants in the transverse direction which are not able to be adjusted by the units 106), additional voids could be produced—corresponding to the first embodiment according to FIGS. 3 to 5—in order to reduce the density even further.

Additionally, in the plant maintenance machine 100 the track width of the wheels is able to be changed by an assigned actuator in order to adapt said track width to the spacings of the plants (e.g., German Patent Appl. No. DE 69 805 859 T2), wherein additionally the front wheels would also have to be adjustable). The adjustment of the track width and the working width of the units for the plant maintenance of the plant maintenance machine 100 may be carried out using a georeferenced map stored during the sowing process by the controller (or the aforementioned prescription map generated in advance) which is provided to an electronic controller of the plant maintenance machine 100. Thus, when dispensing the plants, or already when planning the dispensing of the plants, an automatic creation (planning) of the target tracks takes place and, in the case of a variable track width, also of the track width for the subsequent plant maintenance measure. This planning may accordingly be carried out in an automated manner based on the previously planned dispensing pattern or on the actual dispensing pattern (in particular when this is dependent on sensors fixing the planting density during the dispensing process). The creation of the planning of the (paths and/or track widths of the plant maintenance machine 100 for implementing the) plant maintenance measure may either be carried out directly during the dispensing or in a following step. Alternatively, or additionally (complementary thereto), the track width and/or guidance of the plant maintenance machine 100 may be monitored by a suitable predictive sensor (for example a laser scanner and/or camera with image processing) for identifying the positions of the plants and/or the gaps located therebetween.

In one possible embodiment, tramlines and/or travel tracks extending in the second direction, which have at least approximately uniform spacings in the second direction, could be created by the seed drill 36 for the wheels of the plant maintenance machine 100, which makes an adjustable track width of the plant maintenance machine 100 unnecessary.

It may be identified that the change to the spacings between the plants in the first direction from the left-hand to the right-hand part of the field of FIG. 6 is not carried out abruptly but continuously in order to make it simple or possible for the plant maintenance machine 100 to adapt the positions of its units for plant maintenance by means of the actuator, and optionally its track width during travel.

In a further embodiment, additionally or alternatively to varying the spacings of the plants in the first direction as shown in FIG. 6, it might also be conceivable to vary the spacings of the plants in the second direction and/or the angle between the first and second direction. To this end, an adjustment of the sowing units 60 of the seed drill transversely to the first direction might be provided, similar to the adjustment of the units for plant maintenance of the plant maintenance machine 100. In this case the units for plant maintenance of the plant maintenance machine 100 would also have to be laterally adjustable when traveling in the first direction, similar to the adjustment of the units for plant maintenance of the plant maintenance machine 100 in the second direction as shown in FIG. 6.

Finally, it should be mentioned that agricultural machines 10, 100 are shown in FIGS. 1, 2 and 6 in the form of field tractors which are provided with a workstation for a human operator. Since according to the present description, the field work of these machines may be carried out automatically (the turning processes in the headland, for example, may also be automated, based on position identification and/or by optical sensors in the manner known per se) the workstation could also be dispensed with and the machines 10, 100 designed as autonomous, automatic machines as are disclosed, for example, in European Patent Appl. No. EP 3 406 125 A2. The transport to the field and back to a base station on an agricultural premises may optionally be carried out by a transport vehicle or even autonomously.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the systems, methods, processes, apparatuses and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the systems, apparatuses, devices, methods and/or processes via the use of block diagrams, schematics, flowcharts, examples and/or functional language. Insofar as such block diagrams, schematics, flowcharts, examples and/ or functional language contain one or more functions and/or operations, it will be understood by those within the art that each function and/or operation within such block diagrams, schematics, flowcharts, examples or functional language can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the signal bearing medium used to carry out the distribution. Examples of a signal bearing medium include, but are not limited to, the following: a computer readable memory medium such as a magnetic medium like a floppy disk, a hard disk drive, and magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components associated with, comprised of, contained within or connected with different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two or more components herein combined to achieve a particular functionality can be seen as "associated with" each other such that the desired functionality is achieved, irrespective of architectures or intermediate components. Likewise, any two or more components so associated can also be viewed as being "operably connected", or "operably coupled", to each other to achieve the desired functionality, and any two or more components capable of being so associated can also be viewed as being "operably couplable", to each other to achieve the desired functionality. Specific examples of operably couplable include, but are not limited to, physically mateable and/or physically interacting components, and/or wirelessly interactable and/or wirelessly interacting components, and/or logically interacting and/or logically interactable components.

Unless specifically stated otherwise or as apparent from the description herein, it is appreciated that throughout the present disclosure, discussions utilizing terms such as "accessing," "aggregating," "analyzing," "applying," "brokering," "calibrating," "checking," "combining," "communicating," "comparing," "conveying," "converting," "correlating," "creating," "defining," "deriving," "detecting," "disabling," "determining," "enabling," "estimating," "filtering," "finding," "generating," "identifying," "incorporating," "initiating," "locating," "modifying," "obtaining," "outputting," "predicting," "receiving," "reporting," "retrieving," "sending," "sensing," "storing," "transforming," "updating," "using," "validating," or the like, or other conjugation forms of these terms and like terms, refer to the actions and processes of a control unit, computer system or computing element (or portion thereof) such as, but not limited to, one or more or some combination of: a visual organizer system, a request generator, an Internet coupled computing device, a computer server, etc. In one example, the control unit, computer system and/or the computing element may manipulate and transform information and/or data represented as physical (electronic) quantities within the control unit, computer system's and/or computing element's processor(s), register(s), and/or memory(ies) into other data similarly represented as physical quantities within the control unit, computer system's and/or computing element's memory(ies), register(s) and/or other such information storage, processing, transmission, and/or display components of the computer system(s), computing element (s) and/or other electronic computing device(s). Under the direction of computer-readable instructions, the control unit, computer system(s) and/or computing element(s) may carry out operations of one or more of the processes, methods and/or functionalities of the present disclosure.

Those skilled in the art will recognize that it is common within the art to implement apparatuses and/or devices and/or processes and/or systems in the fashion(s) set forth herein, and thereafter use engineering and/or business practices to integrate such implemented apparatuses and/or devices and/or processes and/or systems into more comprehensive apparatuses and/or devices and/or processes and/or systems. That is, at least a portion of the apparatuses and/or devices and/or processes and/or systems described herein can be integrated into comprehensive apparatuses and/or devices and/or processes and/or systems via a reasonable amount of experimentation.

Although the present disclosure has been described in terms of specific embodiments and applications, persons skilled in the art can, considering this teaching, generate additional embodiments without exceeding the scope or departing from the spirit of the present disclosure described herein. Accordingly, it is to be understood that the drawings and description in this disclosure are proffered to facilitate comprehension of the present disclosure and should not be construed to limit the scope thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

It should also be noted that the different examples described herein can be combined in different ways. That is, parts of one or more examples can be combined with parts of one or more other examples. All of this is contemplated herein.

Example 1 is a method performing an agricultural task on a field, the method comprising:
identifying a number of plants in the field on a per unit area;
determining a field pattern of plant maintenance for the plants in the field, the field pattern comprising:
a planting instruction for travel in a first direction; and
a plant maintenance instruction for travel in a second direction which is not parallel to the first direction, the plant maintenance instruction generated using at least one parameter corresponding to the number of plants in the field on a per unit area.

Example 2 is the method for the performing an agricultural task on a field of any or all previous examples and further comprising the step of planting a seed in the field using the planting instructions with a planter in the first direction.

Example 3 is the method for the performing an agricultural task on a field of any or all previous examples and further comprising the step of performing a plant maintenance measure using the plant maintenance instructions with a plant maintenance machine in the second direction.

Example 4 is the method for the performing an agricultural task on a field of any or all previous examples and further comprising the step of performing a plant maintenance measure using the plant maintenance instructions with a plant maintenance machine traveling in the first direction.

Example 5 is the method for the performing an agricultural task on a field of any or all previous examples and further comprising at least one parameter is generated using at least one of a spacing of the plants in the first direction, a spacing of the plants in the second direction, an angle between the first direction and the second direction, and a number of voids in the field pattern.

Example 6 is the method for the performing an agricultural task on a field of any or all previous examples and further comprising the number of plants per unit area upon which plant maintenance measure will be performed is determined by a respective location on the field.

Example 7 is the method for the performing an agricultural task on a field of any or all previous examples and further comprising the parameter continuously changes in at least one of the first and second direction as a function of the respective location on the field.

Example 8 is the method for the performing an agricultural task on a field of any or all previous examples and further comprising a spacing of an implement of the plant maintenance machine is adjustable using at least one actuator.

Example 9 is the method for the performing an agricultural task on a field of any or all previous examples and further comprising a track width of the plant maintenance machine is adjustable using at least one actuator.

Example 10 is the method for the performing an agricultural task on a field of any or all previous examples and further comprising a tramline associated with at least one of the first and second direction, the tramline configured with at least one of a uniform and a track width in the field pattern.

Example 11 is the method for the performing an agricultural task on a field of any or all previous examples and further comprising a position of the tramline provided for the plant maintenance machine is generated in advance of planting.

Example 12 is the method for performing an agricultural task on a field of any or all previous examples and further comprising a position of the tramline provided for the plant maintenance machine is generated during planting using a local sensor on the planter.

Example 13 is the method for the performing an agricultural task on a field of any or all previous examples and further comprising the track width of the tramline of the plant maintenance machine is generated in advance of planting.

Example 14 is the method for the performing an agricultural task on a field of any or all previous examples and further comprising the track width of the tramline of the plant maintenance machine is generated during planting using a local sensor on the planter.

Example 15 is the method for the performing an agricultural task on a field of any or all previous examples and further comprising the voids in the field pattern occur during planting and are taken into account such that an originally provided void is occupied if an unintentional void arises in the vicinity thereof.

Example 16 is an agricultural machine system for performing an agricultural task in a field, the agricultural machine system comprising:
an agricultural machine;
a frame connected to the agricultural machine, the frame configured with at least two units to perform an agricultural task; and
a controller in communication with the agricultural machine and the at least two units, the controller configured to determine a field pattern for performing the agricultural task, the field pattern comprising:
an agricultural task instruction for travel in a first direction; and
an agricultural task instruction for travel in a second direction which is not parallel to the first direction, the agricultural task instructions for travel in a second direction generated using at least one parameter corresponding to crop density.

Example 17 is the system for the performing an agricultural task on a field of any or all previous examples and further comprising the at least two units are configured to be in an adjustable relationship with each other.

Example 18 is the system for the performing an agricultural task on a field of any or all previous examples and further comprising the agricultural task instructions for travel in the first direction are performed using a planter, the planter configured to plant seed using at least in part a planting instruction.

Example 19 is the system for the performing an agricultural task on a field of any or all previous examples and further comprising the agricultural task instructions for travel in the second direction are performed using a cultivator, the cultivator configured to cultivate plants in the field using at least in part a plant maintenance instruction.

Example 20 is the system for the performing an agricultural task on a field of any or all previous examples and further comprising the agricultural task instructions for travel in the first direction are performed using a cultivator, the cultivator configured to cultivate plants in the field performing a plant maintenance measure using at least in part a plant maintenance instruction.

The invention claimed is:

1. A method for performing an agricultural task on a field, the method comprising:
determining a planting instruction for travel in a first direction, the planting instruction to vary a first spacing between plants in a first row;
determining a plant maintenance instruction for travel in a second direction, which is not parallel to the first direction, the plant maintenance instruction generated using at least one parameter corresponding to a number of plants per unit area in the field; and
positioning a unit on an implement to carry out the plant maintenance instruction based on the first spacing and the at least one parameter.

2. The method of claim 1, further including planting a seed in the field using the planting instruction with a planter in the first direction.

3. The method of claim 2, further including performing a plant maintenance measure using the plant maintenance instruction with a plant maintenance machine in the second direction.

4. The method of claim 1, further including performing a plant maintenance measure using the plant maintenance instruction with a plant maintenance machine in the first direction.

5. The method of claim 3, wherein the at least one parameter of the plant maintenance instruction is generated using at least one of: the first spacing of the plants in the first direction, a second spacing of the plants in the second direction, an angle between the first direction and the second direction, and a planned void in a field pattern.

6. The method of claim 5, wherein the number of plants per unit area upon which the plant maintenance measure will be performed is determined by a respective location on the field.

7. The method of claim 6, wherein the at least one parameter continuously changes in at least one of the first direction and the second direction as a function of the respective location on the field.

8. The method of claim 7, wherein a spacing between a first unit and a second unit of the implement of the plant maintenance machine is adjustable using at least one actuator.

9. The method of claim 7, wherein a track width between wheels of the plant maintenance machine is adjustable using at least one actuator.

10. The method of claim 9, further including adjusting the track width based on at least one of a first tramline of the first direction and a second tramline of the second direction, the first tramline based on a spacing between adjacent rows in the first direction and the second tramline based on the spacing between adjacent rows in the second direction.

11. The method of claim 10, wherein a position of the second tramline is generated for the plant maintenance machine in advance of planting.

12. The method of claim 10, wherein a position of the second tramline is generated for the plant maintenance machine during planting using a local sensor on the planter.

13. The method of claim 10, wherein the track width of the second tramline of the plant maintenance machine is generated in advance of planting.

14. The method of claim 10, wherein the width of the track width of the second tramline of the plant maintenance machine is generated during planting using a local sensor on the planter.

15. The method of claim 5, wherein the plant maintenance instruction updates a location of the planned void in the field pattern based on an occurrence of an unintentional void, the unintentional void to occur during planting in a different location from the planned void.

16. An agricultural machine system for performing an agricultural task in a field, the agricultural machine system comprising:
   an agricultural machine;
   a frame connected to the agricultural machine, the frame configured with at least two units to perform an agricultural task;
   a controller in communication with the agricultural machine and the at least two units, the controller configured to determine agricultural task instructions, the agricultural task instructions including:
      a first agricultural task instruction for travel in a first direction, the first agricultural task instruction to vary a first spacing between plants in a first row; and
      a second agricultural task instruction for travel in a second direction, which is not parallel to the first direction, the second agricultural task instruction for travel in the second direction is generated using at least one parameter corresponding to crop density; and
   actuators in communication with the agricultural machine and the at least two units, the actuators configured to position the at least two units based on the first spacing and the at least one parameter.

17. The agricultural machine system of claim 16, wherein the at least two units are configured to be in an adjustable relationship with each other.

18. The agricultural machine system of claim 16, wherein the first agricultural task instruction is performed using a planter, the planter configured to plant seed using at least in part a planting instruction.

19. The agricultural machine system of claim 16, wherein the second agricultural task instruction is performed using a cultivator, the cultivator configured to cultivate plants in the field using at least in part a plant maintenance instruction.

20. The agricultural machine system of claim 16, wherein the first agricultural task instruction is performed using a cultivator, the cultivator configured to cultivate plants in the field performing a plant maintenance measure using at least in part a plant maintenance instruction.

* * * * *